US012785821B2

(12) United States Patent
Wang

(10) Patent No.: US 12,785,821 B2
(45) Date of Patent: Nov. 3, 2026

(54) METHOD AND APPARATUS FOR NETWORK PERFORMANCE IMPROVEMENT

(71) Applicant: Lenovo (Beijing) Limited, Beijing (CN)

(72) Inventor: Jianfeng Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 351 days.

(21) Appl. No.: 18/711,071

(22) PCT Filed: Nov. 19, 2021

(86) PCT No.: PCT/CN2021/131849
§ 371 (c)(1),
(2) Date: May 16, 2024

(87) PCT Pub. No.: WO2023/087263
PCT Pub. Date: May 25, 2023

(65) Prior Publication Data
US 2025/0300744 A1 Sep. 25, 2025

(51) Int. Cl.
*H04L 41/5009* (2022.01)
*H04B 17/11* (2015.01)
(Continued)

(52) U.S. Cl.
CPC ............ *H04B 17/11* (2015.01); *H04L 5/0053* (2013.01); *H04L 41/5009* (2013.01); *H04W 60/04* (2013.01)

(58) Field of Classification Search
CPC .. H04L 5/0053; H04L 41/5009; H04W 60/04; H04B 17/11
See application file for complete search history.

(56) References Cited

U.S. PATENT DOCUMENTS 7,639,661 B2 * 12/2009 Iwami .................... H04W 48/08 455/443
2013/0203414 A1 8/2013 Zong et al.

FOREIGN PATENT DOCUMENTS

CN 101030968 A 9/2007
CN 110248409 A 9/2019
(Continued)

OTHER PUBLICATIONS

PCT/CN2021/131849 , "International Search Report and Written Opinion", International Application No. PCT/CN2021/131849, Aug. 4, 2022, 6 pages.
(Continued)

*Primary Examiner* — Gbemileke J Onamuti
(74) *Attorney, Agent, or Firm* — FIG. 1 Patents

(57) ABSTRACT

Embodiments of the present disclosure relate to a method and apparatus for network performance improvement. According to some embodiments of the disclosure, a network management entity may transmit, to a managed node, a request for attribution information of the managed node, wherein the network management entity manages the managed node; receive, from the managed node, the requested attribution information of the managed node; transmit, to a BS of a RAN, a registration request to register in the RAN, wherein the managed node is configured to adjust a radio propagation environment of the RAN; and receive, from the BS, an acknowledgement message in response to the registration request.

20 Claims, 5 Drawing Sheets

(51) Int. Cl.
*H04L 5/00* (2006.01)
*H04W 60/04* (2009.01)

(56) References Cited

FOREIGN PATENT DOCUMENTS

| | | | |
|---|---|---|---|
| CN | 111416646 | A | 7/2020 |
| CN | 111983560 | A | 11/2020 |
| CN | 112040532 | A | 12/2020 |
| WO | 2021207748 | A2 | 10/2021 |

OTHER PUBLICATIONS

"Extended European Search Report", EP Application No. 21964417.6, Jul. 2, 2025, 9 pages.

* cited by examiner

METHOD AND APPARATUS FOR NETWORK PERFORMANCE IMPROVEMENT

TECHNICAL FIELD

Embodiments of the present disclosure generally relate to communication technology, and more particularly to improve the performance of a communication network.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

The 5G mobile communication system focuses on, for example, three typical use cases with different requirements: enhanced mobile broadband (eMBB), ultra-reliable and low-latency communications (URLLC), and massive machine type communications (mMTC), which has led to a new vision of communication. During the standardization process of 5G networks in the 3rd generation partnership project (3GPP), especially for a radio access network (RAN), a lot of technologies have been studied and specified to satisfy requirements such as flexible numerologies, higher carry frequency (e.g., millimeter wave (mmWave)), wider bandwidth, advanced channel codec and multi-antennas supporting flexible beamforming. With well-designed physical channels, signals and relevant procedures, current new radio (NR) technical specifications defined by 3GPP (e.g., release 16) can satisfy the expected requirements.

On the other hand, in a wireless communication system such as a 5G mobile communication system, higher throughput, larger coverage and some other improvements have always been obtained via wider bandwidth, higher energy-consuming and higher signal processing complexity, which may not be sustainable for further evolution. Therefore, it is desirable to explore a sustainable communication paradigm to satisfy, for example, new challenging requirements brought by new user requirements, new applications and use cases, and new networking structures.

SUMMARY

Some embodiments of the present disclosure provide a network management entity. The network management entity may include: a transceiver; and a processor coupled to the transceiver. The processor may be configured to: transmit, to a managed node, a request for attribution information of the managed node, wherein the network management entity manages the managed node: receive, from the managed node, the requested attribution information of the managed node: transmit, to a base station (BS) of a radio access network (RAN), a registration request to register in the RAN, wherein the managed node may be configured to adjust a radio propagation environment of the RAN; and receive, from the BS, an acknowledgement message in response to the registration request.

In some embodiments of the present disclosure, the network management entity may be a reconfigurable intelligent surface (RIS) management center, and the managed node may be an RIS device. In some embodiments of the present disclosure, the network management entity may be incorporated into the BS, or the network management entity may be independent from the BS.

In some embodiments of the present disclosure, the processor may be further configured to receive a request from the BS to enable a coefficient tuning procedure; and perform the coefficient tuning procedure in response to the request to enable the coefficient tuning procedure. In some embodiments of the present disclosure, the request to enable the coefficient tuning procedure may indicate at least one of: a time interval or a location of the managed node for updating coefficients of the managed node. The coefficient tuning procedure may be performed based on at least one of the time interval or the location of the managed node.

In some embodiments of the present disclosure, to perform the coefficient tuning procedure, the processor may be configured to: select a set of coefficients for the managed node: transmit, to the managed node, configuration information associated with the managed node, wherein the configuration information may indicate an identity of the managed node, the selected set of coefficients, and a time to implement the selected set of coefficients: transmit, to the BS, a request for network performance information in response to the transmission of the configuration information; and receive the requested network performance information.

In some embodiments of the present disclosure, the processor may be further configured to: determine a completion of the coefficient tuning procedure; and in response to the completion of the coefficient tuning procedure, determine at least one optimal configuration associated with at least one network performance optimization target for the managed node based on the transmitted configuration information and the received network performance information, and inform the BS of the completion of the coefficient tuning procedure. The processor may be further configured to: receive an optimization target from the BS: select an optimal configuration from the at least one optimal configuration according to the received optimization target; and transmit the selected optimal configuration to the managed node.

In some embodiments of the present disclosure, to perform the coefficient tuning procedure, the processor may be configured to: receive, from the BS, an indication to configure a set of coefficients for the managed node; and transmit, to the managed node, configuration information associated with the managed node in response to the reception of the indication, wherein the configuration information may include an identity of the managed node, the set of coefficients, and a time to implement the set of coefficients. The processor may be further configured to: receive an optimal configuration for the managed node from the BS, wherein the optimal configuration may be associated with a network performance optimization target: transmit the optimal configuration to the managed node; and transmit an acknowledgement of the optimal configuration to the BS.

In some embodiments of the present disclosure, the processor may be further configured to receive, from the managed node, an environment sensing result of the managed node in response to the transmission of the configuration information. In some embodiments of the present disclosure, the processor may be further configured to: receive, from the managed node, an environment sensing result of the managed node in response to the transmission of the configuration information; and transmit the environment sensing result to the BS.

In some embodiments of the present disclosure, the processor may be further configured to receive, from the managed node, an update of the attribution information of the managed node.

Some embodiments of the present disclosure provide a base station (BS). The BS may include: a transceiver; and a processor coupled to the transceiver. The processor may be configured to: receive, from a network management entity, a registration request to register in a radio access network (RAN) associated with the BS, wherein the network management entity manages a managed node which is configured to adjust a radio propagation environment of the RAN; and transmit, to the network management entity, an acknowledgement message in response to the registration request.

In some embodiments of the present disclosure, the network management entity may be a reconfigurable intelligent surface (RIS) management center, and the managed node may be an RIS device. In some embodiments of the present disclosure, the network management entity may be incorporated into the BS, or the network management entity may be independent from the BS.

In some embodiments of the present disclosure, the acknowledgement message may indicate that the network management entity is authorized to access network performance information.

In some embodiments of the present disclosure, the processor may be further configured to transmit, to the network management entity, a request to enable a coefficient tuning procedure, wherein the request to enable the coefficient tuning procedure may indicate at least one of: a time interval or a location of the managed node for updating coefficients of the managed node.

In some embodiments of the present disclosure, the processor may be further configured to: receive, from the network management entity, a request for the network performance information; and transmit, to the network management entity, the requested network performance information.

In some embodiments of the present disclosure, the processor may be further configured to transmit, to the network management entity, a network performance optimization target.

In some embodiments of the present disclosure, the processor may be further configured to receive, from the network management entity, an indication of a completion of the coefficient tuning procedure.

In some embodiments of the present disclosure, the registration request may comprise attribution information of the managed node.

In some embodiments of the present disclosure, to perform the coefficient tuning procedure, the processor may be configured to transmit, to the network management entity, an indication to configure a set of coefficients for the managed node. In some embodiments of the present disclosure, the processor may be further configured to: determine a completion of the coefficient tuning procedure; and in response to the completion of the coefficient tuning procedure, determine at least one optimal configuration associated with at least one network performance optimization target for the managed node based on the configured set of coefficients and corresponding network performance information, and inform the network management entity of the completion of the coefficient tuning procedure. In some embodiments of the present disclosure, the processor may be further configured to: transmit, to the network management entity, an optimal configuration from the at least one optimal configuration; and receive, from the network management entity, an acknowledgement of the optimal configuration.

In some embodiments of the present disclosure, the processor may be further configured to receive, from the network management entity, an environment sensing result of the managed node.

Some embodiments of the present disclosure provide a method performed by a network management entity. The method may include: transmitting, to a managed node, a request for attribution information of the managed node, wherein the network management entity manages the managed node: receiving, from the managed node, the requested attribution information of the managed node: transmitting, to a base station (BS) of a radio access network (RAN), a registration request to register in the RAN, wherein the managed node is configured to adjust a radio propagation environment of the RAN; and receiving, from the BS, an acknowledgement message in response to the registration request.

Some embodiments of the present disclosure provide a method performed by a base station (BS). The method may include: receiving, from a network management entity, a registration request to register in a radio access network (RAN) associated with the BS, wherein the network management entity manages a managed node which is configured to adjust a radio propagation environment of the RAN; and transmitting, to the network management entity, an acknowledgement message in response to the registration request.

Some embodiments of the present disclosure provide an apparatus. According to some embodiments of the present disclosure, the apparatus may include: at least one non-transitory computer-readable medium having stored thereon computer-executable instructions: at least one receiving circuitry: at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present application provide a technical solution for improving network performance, which can facilitate and improve the implementation of various communication technologies.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

In modern wireless communications, the propagation medium, i.e., radio, has been perceived as a randomly behaving entity between the transmitter and the receiver, which may degrade the quality of the received signal due to uncontrollable fading of the radio waves caused by the surrounding objects. If network operators can control the scattering, reflection, and refraction characteristics of the radio waves, by overcoming the negative effects of natural wireless propagation, performance can be improved without the need for complex signal processing, radio frequency processing operations, and extra energy consumption.

Embodiments of the present disclosure provide solutions for introducing a component, which is capable of overcoming the above negative effects, into wireless communication systems. In some examples, a component capable of modifying the wireless channel via controlling reflection coefficients may be employed.

For example, a re-configurable intelligent surface (RIS) may be employed. In some examples, the RIS may be a planar meta-surface equipped with a large number of passive reflecting elements connected to a smart controller, which may be capable of inducing an independent phase shift and/or amplitude attenuation (named as "reflection coefficient") to the incident signal at each reflecting element in real-time. In this way, an RIS can modify the wireless channels between one or more pairs of transmitters and receivers and even the propagation environment to be more favorable for their communications. Although some of the below embodiments may use the RIS as an example of such component for illustrative purposes, it is contemplated that these embodiments can be applied other component(s) having a similar function.

Figure 1:
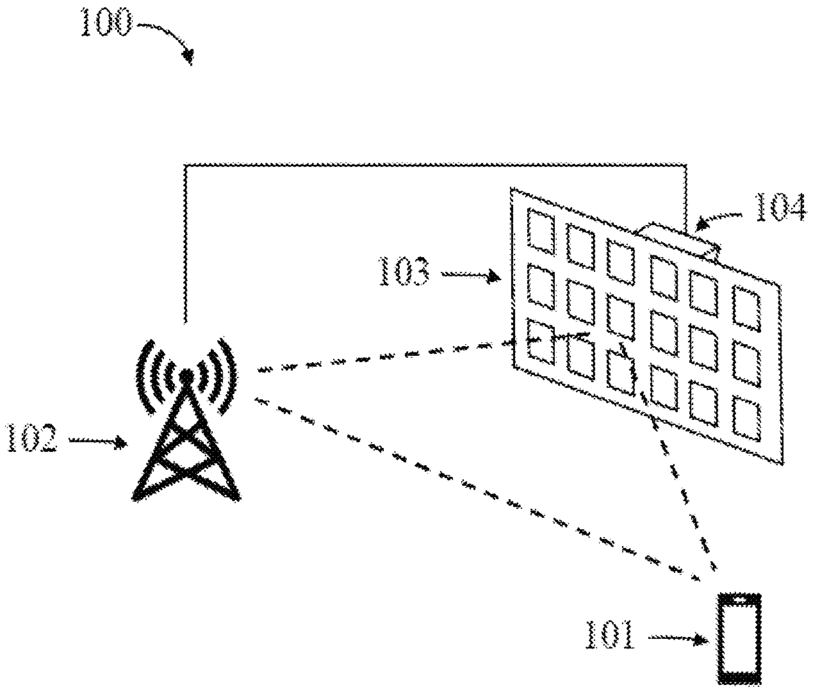
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include a UE (e.g., UE 101) and a base station (e.g., BS 102). The wireless communication system 100 may further include an RIS 103 and an RIS controller 104. Although a specific number of UE 101, BS 102, RIS 103 and RIS controller 104 is depicted in FIG. 1, it is contemplated that any number of UEs, BSs, RISs, and RIS controllers may be included in the wireless communication system 100.

UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, UE 101 includes wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. UE 101 may communicate with BS 102 via uplink (UL) communication signals.

BS 102 may be distributed over a geographic region. In certain embodiments of the present disclosure, BS 102 may also be referred to as an access point, an access terminal, a base, a base unit, a macro cell, a Node-B, an evolved Node B (eNB), a gNB, a Home Node-B, a relay node, or a device, or described using other terminology used in the art. BS 102 is generally a part of a radio access network that may include one or more controllers communicably coupled to one or more corresponding BSs 102. BS 102 may communicate with UE 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, BS 102 and UE 101 may communicate using other communication protocols, such as the IEEE 802.11 family of wireless communication protocols. Further, in some embodiments of the present disclosure, BS 102 and UE 101 may communicate over licensed spectrums, whereas in some other embodiments, BS 102 and UE 101 may communicate over unlicensed spectrums. The present disclosure is not intended to be limited to the implementation of any particular wireless communication system architecture or protocol.

In some embodiments of the present disclosure, RIS 103 may be connected to RIS controller 104 via a wired or wireless link. RIS controller 104 may manage RIS 104 and may be connected to BS 102 via a wired or wireless link. As shown in FIG. 1, the wireless channel(s) between UE 101 and BS 102 may be modified by RIS 103.

Since components such as RISs mainly include passive devices without the need of active transmit radio frequency (RF) chains, they can be densely deployed in wireless networks at low cost and low energy consumption. Thus, when such more RISs are deployed and managed, the propagation environment of the network is expected to be more favorable. On the other hand, there are issues that, for example, the management of the deployed RISs, the interfaces between network nodes, and signal and procedure designs in a system supporting RISs, may occur with the deployment of the RISs, especially with the increasing number of RISs being deployed.

Embodiments of the present disclosure provide solutions for solving the above issues. For example, in some embodiments of the present disclosure, solutions for introducing an RIS network including a plurality of RISs into a wireless network (e.g., a radio access network (RAN)) to fine tune the radio propagation environment so as to improve the long-term (e.g., semi-static) network performance are proposed. In some embodiments of the present disclosure, a management center may be introduced to attach the RIS network to a RAN. In some embodiments of the present disclosure, by configuring the coefficients of the RISs in the network, the propagation environment can be tuned so as to improve long-term network performance.

Figure 2:
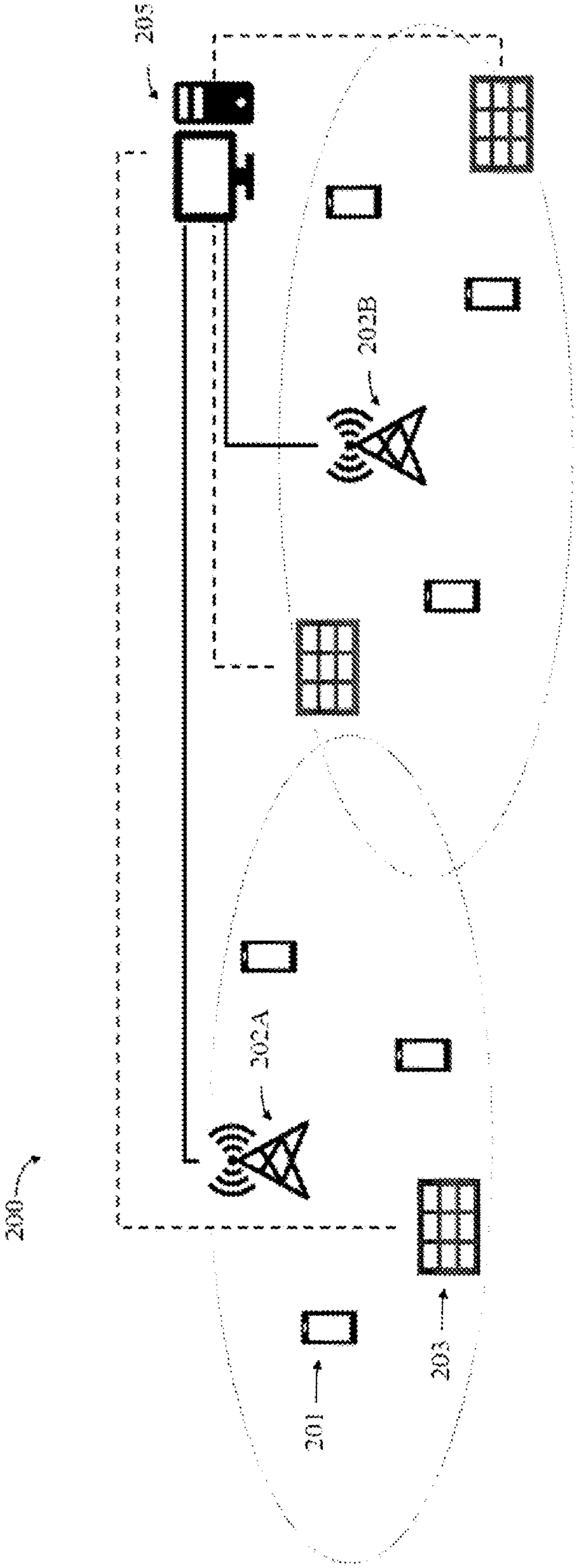
FIG. 2 illustrates a schematic diagram of a wireless communication system in accordance with some embodiments of the present disclosure.

FIG. 2 illustrates a schematic diagram of a wireless communication system 200 in accordance with some embodiments of the present disclosure.

As shown in FIG. 2, wireless communication system 200 may include some UEs (e.g., UE 201), some base stations (e.g., BSs 202A and 202B), some RISs (e.g., RIS 203) and an RIS management center 205. Although a specific number of UEs, BSs, RISs and RIS management centers is depicted in FIG. 2, it is contemplated that any number of UEs, BSs, RISs and RIS management centers may be included in the wireless communication system 200. Although RIS management center 205 is depicted as independent from the BS (e.g., BSs 202A and 202B), it is contemplated that RIS management center 205 may be incorporated into a BS of a RAN.

UE 201 may function as UE 101 as shown in FIG. 1. BSs 202A and 202B may function as BS 102 as shown in FIG. 1 and may be a part of a RAN. RIS management center 205 may be attached to the RAN to adjust its propagation environment. For example, as shown in FIG. 2, RIS management center 205 may be in communication with at least one of BSs 202A and 202B.

In some embodiments of the present disclosure, an RIS management center (e.g., RIS management center 205) may be a logic function, an entity, or an apparatus to manage RISs (e.g., RIS 203) in an area (the coverage area of a RAN or a BS), which may constitute an RIS network. In some examples, the RIS management center can collect configurations of all managed RISs and configure the managed RIS. For example, RIS management center 205 can turn on or turn off RIS 203, and set a dedicated set of coefficients for RIS 203. In some examples, the RIS network controlled by an RIS Management Center can also be operated by the attached network operator.

In some embodiments of the present disclosure, an RIS (e.g., RIS 203) may be connected to an RIS management center (e.g., RIS management center 205) via any arbitrary network or technique, for example, via a wired or wireless link. The connection (e.g., interface) between the RIS and the RIS management center may deliver RIS-relevant control information within the RIS network. In some examples, the detailed function in a RAN can be the network data analytics function (NWDAF).

In some embodiments of the present disclosure, an RIS management center (e.g., RIS management center 205) may be connected to a RAN (e.g., a BS such as BS 202A or 202B) via any arbitrary network or technique, for example, via a wired or wireless link. The connection (e.g., interface) between the RAN and the RIS management center may deliver network-relevant control and signal information. In some examples, the detailed function in a RAN can be the network data analytics function (NWDAF).

Embodiments of the present disclosure further provide various procedures and signaling to tune the coefficients of the RISs so as to improve the network performance. More details on the embodiments of the present disclosure will be illustrated in the following text in combination with the appended drawings.

Figure 3:
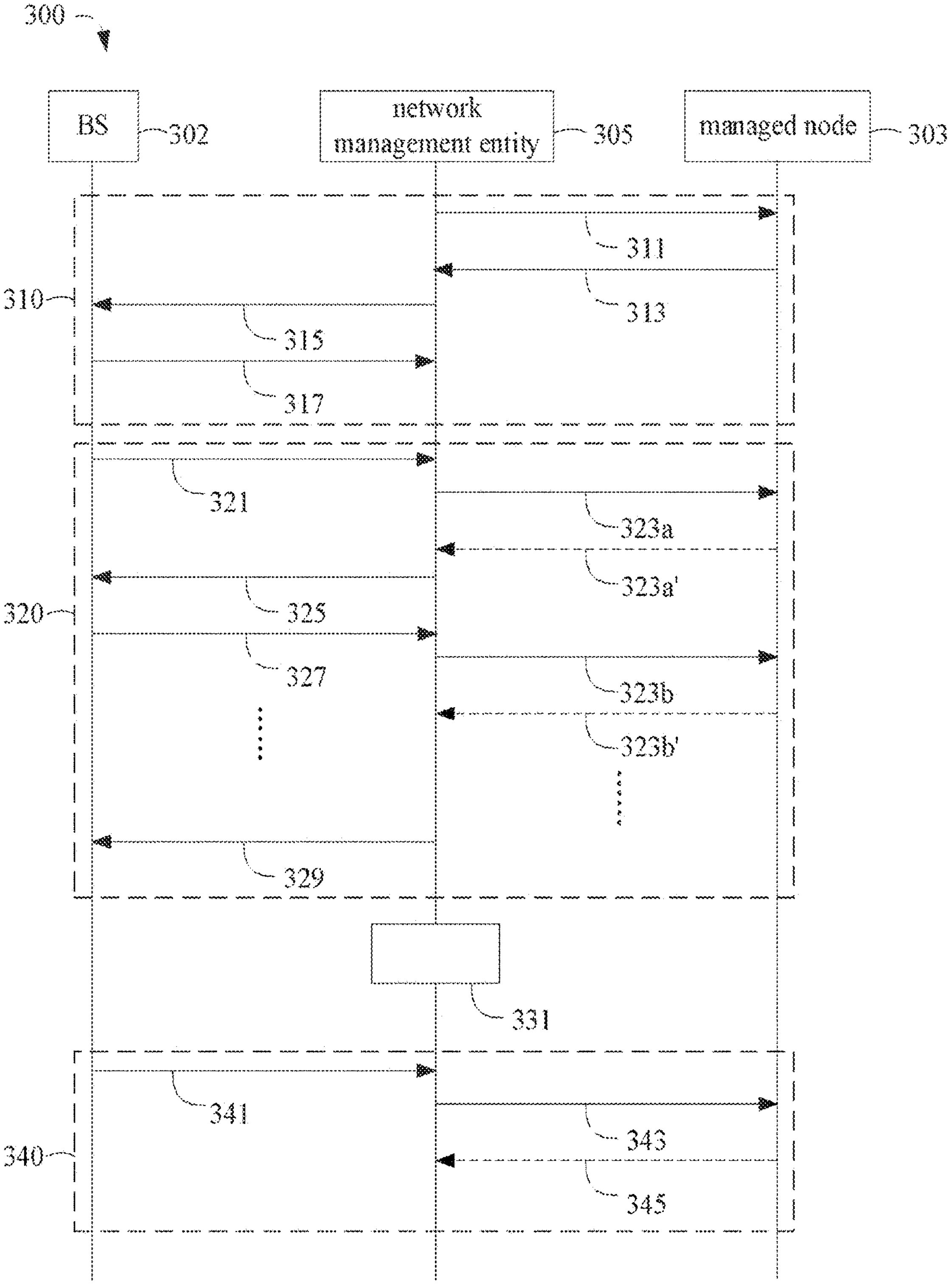
FIG. 3 illustrates a flow chart of an exemplary procedure of wireless communications in accordance with some embodiments of the present disclosure.

FIG. 3 illustrates a flow chart of an exemplary procedure 300 of wireless communications in accordance with some embodiments of the present disclosure. Details described in all of the foregoing embodiments of the present disclosure are applicable for the embodiments shown in FIG. 3.

Referring to FIG. 3, network management entity 305 may manage at least one managed node. For example, managed node 303 may be connected to and registered with network management entity 305. Network management entity 305 and managed node 303 may function as RIS management center 205 and RIS 203 shown in FIG. 2, respectively. BS 302 may function as BS 202A or BS 202B shown in FIG. 2.

In the exemplary procedure 300, network-related information may be available to network management entity 305. In the exemplary procedure 300, network management entity 305 may collect network-relative information, for example, cell-throughput, coverage, and energy consumption, with corresponding RIS coefficients. Network management entity 305 may analyze and determine optimal coefficients for different network performance optimization target, such as cell-throughput, coverage, and energy consumption. In response to being finely tuned, BS 302 (in some examples, a mobile network operator) may indicate an optimization target to network management entity 305, which can select a corresponding set of RIS coefficients to realize the target.

As shown in FIG. 3, the exemplary procedure 300 may include an initialization procedure 310, a coefficient tuning procedure 320, and a setting procedure 340.

During the initialization procedure 310, network management entity 305 may collect information of the managed nodes managed by network management entity 305 (e.g., all managed nodes managed by the network management entity 305). Network management entity 305 may register itself in a RAN.

For example, referring to FIG. 3, in operation 311, network management entity 305 may request managed node 303 to feed back its attribution information. In operation 313, in response to the request, managed node 303 may transmit the requested attribution information to network management entity 305. In this way, network management entity 305 may collect and store attribution information of all managed nodes managed by the network management entity 305.

In some embodiments, the attribution information of a managed node may include at least one of the following: an identity of the managed node: a type indication of the managed node: a set of candidate coefficients of the managed node: a position of the managed node: or an orientation of the managed node. In some examples, the type indication of a managed node may indicate the capability of the managed node. For example, the type indication may indicate whether the managed node supports a sensing function, or a signal procession function.

For instance, the attribution information of a managed node may be represented as RIS-Attr-information={id, type, coefficient set, position, orientation}. In some examples, when the attribution information of a managed node is updated, the managed node may transmit a corresponding update to the network management entity via, for example, dedicated signaling.

Network management entity 305 may register itself in a RAN for authorization. After the registration, network management entity 305 may be authorized to access relevant network information. For example, in operation 315, network management entity 305 may transmit a registration request to BS 302 to register in the RAN associated with BS 302. In response to receiving the registration request, BS 302 may determine whether network management entity 305 has authorization and may determine that network management entity 305 does have the authorization. In operation 317, BS 302 may transmit an acknowledgement (ACK) message to network management entity 305.

In some examples, the ACK message may indicate the category(s) of the network performance information network management entity 305 can access. The network performance information may include at least one of the distribution of UEs (e.g., UE geometry) served by BS 302 (or the associated RAN), the cell throughput of BS 302 (or the associated RAN), or the energy consumption of BS 302 (or the associated RAN).

In some examples, the configurations and connections could be static. The above procedure can be performed once for all or over a very long period, such as a month.

During the coefficient tuning procedure 320, network management entity 305 may optimize the coefficient selection on each managed node (e.g., RIS), for example, at different time intervals and/or locations in a day.

For example, referring to FIG. 3, in operation 321, BS 302 may transmit a request to network management entity 305 to enable a coefficient tuning procedure. In some examples, the request to enable the coefficient tuning procedure may indicate at least one of: a time interval or a location of a managed node for updating coefficients of the managed node. For example, the request may indicate that network management entity 305 should select a new set of coefficients for the managed node every two hours. For example, network management entity 305 may configure a managed node to update its coefficients when the indicated location requirement is satisfied.

In response to receiving the request, network management entity 305 may perform the coefficient tuning procedure. For example, network management entity 305 may perform the coefficient tuning procedure based on at least one of the configured time interval or the configured location.

In some embodiments, to perform the coefficient tuning procedure, network management entity 305 may select a set of coefficients for managed node 303. For example, network management entity 305 may select and configure a corresponding set of coefficients for managed node 303 with a periodicity (e.g., every two hours) determined based on the time interval indicated in the request to enable the coefficient tuning procedure.

In operation 323*a*, network management entity 305 may transmit configuration information associated with managed node 303 to managed node 303. In some examples, the configuration information may indicate an identity of managed node 303, the selected set of coefficients, and a time to implement the selected set of coefficients.

For instance, the configuration information may be represented as RIS-coeff-information={id, coefficient-set-id, time}, where id is the identity of the target managed node (e.g., managed node 303), coefficient-set-id is the selected coefficient set, and time indicates the time stamp when to implement the selected coefficient.

In operation 323*a*' (denoted by dotted arrow as an option), when managed node 303 can actively sense the environment, which can be regarded as a kind of advanced managed node, managed node 303 may transmit the sensing results, such as channel state information (CSI) and receiver signal strength (RSS), to network management entity 305 in response to applying the set of coefficients in the configuration information. Network management entity 305 may use the sensing results to determine whether the selected coefficient set can optimize network performance. When managed node 303 does not have such capability, operation 323*a*' can be omitted.

In response to the transmission of the configuration information, (e.g., after indicating the corresponding configuration information to all managed nodes managed by network management entity 305), network management entity 305 may, in operation 325, transmit a request for network performance information to BS 302. In operation 327, BS 302 may transmit the requested network performance information to network management entity 305.

The network performance information may include at least one of the following information: a distribution of UEs (e.g., UE geometry) served by BS 302 (or the associated RAN), the cell throughput of BS 302 (or the associated RAN), or the energy consumption of BS 302 (or the associated RAN), and a time when the at least one of the above information is collected. In some examples, the distribution of UEs may be determined based on the receiving signal quality of the serving UEs. The above information may be related with an optimization target. For instance, the network performance information may be represented as NW-perf-information={time, cell-throughput, geometry}.

During the coefficient tuning procedure, the above operations may be repeatedly performed. For example, operation 323*b* may be similar to operation 323*a* except that another set of coefficients may be selected and configured to managed node 303 in operation 323*b*. Operation 323*b*' is optional and is similar to operation 323*a'*.

At some point, network management entity 305 may determine a completion of the coefficient tuning procedure. For example, when all combinations of candidate coefficients of all managed nodes are checked, network management entity 305 may determine the completion of the coefficient tuning procedure. For example, when the number of coefficient configuration operations reaches a threshold (e.g., operations 323*a*-327 being repeated a certain number of times), network management entity 305 may determine the completion of the coefficient tuning procedure.

In response to the completion of the coefficient tuning procedure, network management entity 305 may, in operation 329, inform BS 302 of the completion of the coefficient tuning procedure.

During the coefficient tuning procedure, network management entity 305 may collect enough network performance information with the corresponding configuration information (e.g., coefficients for managed nodes). In response to the completion of the coefficient tuning procedure, network management entity 305 may, in operation 331, determine at least one optimal configuration associated with at least one network performance optimization target (e.g., cell-throughput, coverage, and energy consumption) for managed node 303 (as well as other managed node(s)) based on the transmitted configuration information and the correspondingly received network performance information.

For example, for each managed node, network management entity 305 may determine the best coefficients for a network performance optimization target at a certain time of day as shown in below Table 1.

For example, at different times of day, network management entity 305 may select a corresponding optimal coefficient for managed node 303 from, for example, a corresponding coefficient table based on the received optimization target. For instance, assuming that Table 1 is derived and the optimization target is cell-throughput, at, for example, time 00:00~02:00, network management entity 305 may configure Coeff_1, Coeff_3, and Coeff_4 for managed nodes RIS0, RIS1, and RIS2, respectively.

In operation 343, network management entity 305 may transmit the selected optimal configuration to managed node 303. In operation 345 (denoted by dotted arrow as an option), when managed node 303 can actively sense the environment, managed node 303 may transmit the sensing results to network management entity 305 in response to applying the optimal configuration. When managed node 303 does not have such capability, operation 345 can be omitted.

In some embodiments, when any long-term network-related information changes, such as network deployment, it may be necessary to re-perform the coefficient tuning procedure, and thus new coefficient tables for various optimization targets may be obtained. The setting procedure may also be re-started when needed.

It should be appreciated by persons skilled in the art that the sequence of the operations in exemplary procedure 300 may be changed and some of the operations in exemplary procedure 300 may be eliminated or modified, without departing from the spirit and scope of the disclosure.

TABLE 1

Coefficients for cell-throughput optimization at different times of day

| Time | 00:00~02:00 | 02:00~04:00 | 04:00~06:00 | 06:00~08:00 | 08:00~10:00 | 10:00~12:00 |
|---|---|---|---|---|---|---|
| RIS0 | Coeff_1 | Coeff_1 | Coeff_1 | Coeff_2 | Coeff_6 | Coeff_6 |
| RIS1 | Coeff_3 | Coeff_3 | Coeff_4 | Coeff_7 | Coeff_7 | Coeff_8 |
| RIS2 | Coeff_4 | Coeff_4 | Coeff_6 | Coeff_6 | Coeff_7 | Coeff_7 |
| . . . | . . . | . . . | . . . | . . . | . . . | . . . |
| Time | 12:00~14:00 | 14:00~16:00 | 16:00~18:00 | 18:00~20:00 | 20:00~22:00 | 22:00~24:00 |
| RIS0 | Coeff_7 | Coeff_2 | Coeff_4 | Coeff_4 | Coeff_3 | Coeff_1 |
| RIS1 | Coeff_8 | Coeff_9 | Coeff_7 | Coeff_2 | Coeff_2 | Coeff_3 |
| RIS2 | Coeff_2 | Coeff_7 | Coeff_7 | Coeff_6 | Coeff_1 | Coeff_2 |
| . . . | . . . | . . . | . . . | . . . | . . . | . . . |

It should be understood that Table 1 is only for illustrative purposes, and should not be construed as limiting the embodiments of the present disclosure. Similar tables can be derived for various optimization targets, such as coverage, energy consumption, or any combination thereof, when corresponding network performance information can be obtained. After the optimal coefficients are derived, the coefficients of each managed node can be configured for the managed node according to the coefficient tables at different times of day.

For example, the setting procedure 340 may be performed such that the managed nodes can be configured based on the desired network performance optimization target and the derived optimal coefficients.

For example, in operation 341, BS 303 may transmit an optimization target (e.g., cell-throughput, coverage, energy consumption, or any combination thereof) to network management entity 305. Network management entity 305 may select an optimal configuration from the at least one optimal configuration according to the received optimization target.

Figure 4:
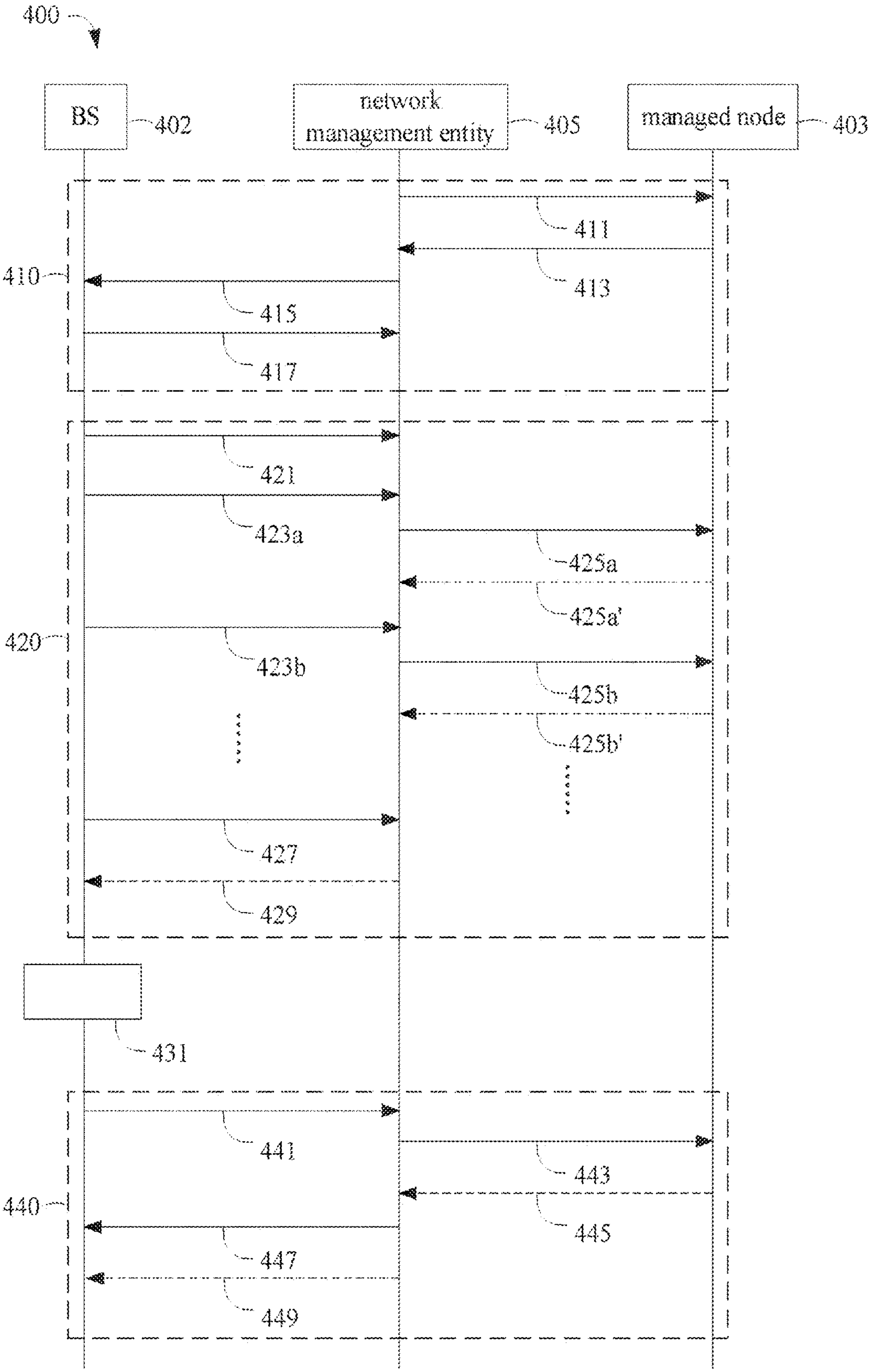
FIG. 4 illustrates a flow chart of an exemplary procedure of wireless communications in accordance with some embodiments of the present disclosure.

FIG. 4 illustrates a flow chart of an exemplary procedure 400 of wireless communications in accordance with some embodiments of the present disclosure. Details described in all of the foregoing embodiments of the present disclosure are applicable for the embodiments shown in FIG. 4.

Referring to FIG. 4, network management entity 405 may manage at least one managed node. For example, managed node 403 may be connected to and registered with network management entity 405. Network management entity 405 and managed node 403 may function as RIS management center 205 and RIS 203 shown in FIG. 2, respectively. BS 402 may function as BS 202A or BS 202B shown in FIG. 2.

In the exemplary procedure 400, network-related information may not be available to network management entity 405, and thus the coefficient tuning procedure may be mainly controlled by BS 402 (e.g., the associated RAN) with the assistance of network management entity 405. For example, during the coefficient tuning procedure, the optimal coefficients may be determined according to the indications from BS 402 (e.g., the registered RAN), where the results with different coefficient configurations will be analyzed. In response to being finely tuned, BS 402 (in some examples, a mobile network operator) can set the corresponding set of coefficients based on the optimization target and instruct network management entity 405 to configure the coefficients to the managed nodes (e.g., managed node 403).

As shown in FIG. 4, the exemplary procedure 400 may include an initialization procedure 410, a coefficient tuning procedure 420, and a setting procedure 440.

During the initialization procedure 410, network management entity 405 may collect information of the managed nodes managed by network management entity 405 (e.g., all managed nodes managed by the network management entity 405). Network management entity 405 may register itself in a RAN.

For example, referring to FIG. 4, in operation 411, network management entity 405 may request managed node 403 to feed back its attribution information. In operation 413, in response to the request, managed node 403 may transmit the requested attribution information to network management entity 405. In this way, network management entity 405 may collect and store attribution information of all managed nodes managed by the network management entity 405.

In some embodiments, the attribution information of a managed node may include at least one of the following: an identity of the managed node: a type indication of the managed node: a set of candidate coefficients of the managed node: a position of the managed node: or an orientation of the managed node. In some examples, the type indication of a managed node may indicate the capability of the managed node. For example, the type indication may indicate whether the managed node supports a sensing function or a signal procession function.

For instance, the attribution information of a managed node may be represented as RIS-Attr-information={id, type, coefficient set, position, orientation}. In some examples, when the attribution information of a managed node is updated, the managed node may transmit a corresponding update to the network management entity via, for example, dedicated signaling. In some examples, the updated attribution information may be transmitted to the registered RAN.

Network management entity 405 may register itself in a RAN for authorization. For example, in operation 415, network management entity 405 may transmit a registration request to BS 402 to register in the RAN associated with BS 402. The registration request may include the attribution information of the managed nodes collected by network management entity 405. In response to receiving the registration request, BS 402 may determine whether network management entity 405 has authorization and may determine that network management entity 405 does have authorization. In operation 417, BS 402 may transmit an acknowledgement (ACK) message to network management entity 405.

In some examples, the configurations and connections could be static. The above procedure can be performed once for all or over a very long period, such as a month.

During the coefficient tuning procedure 420, BS 402 and network management entity 405 may optimize the coefficient selection on each managed node (e.g., RIS), for example, at different time intervals and/or locations in a day.

For example, referring to FIG. 4, in operation 421, BS 402 may transmit a request to network management entity 405 to enable a coefficient tuning procedure. In some examples, the request to enable the coefficient tuning procedure may indicate at least one of: a time interval or a location of a managed node for updating coefficients of the managed node. For example, the request may indicate that network management entity 405 should select a new set of coefficients for the managed node every two hours. For example, network management entity 405 may configure a managed node to update its coefficients when the indicated location requirement is satisfied.

In operation 423*a*, BS 402 may transmit an indication to network management entity 405 to configure sets of coefficients for the managed nodes. In some embodiments, the indication may be transmitted in the same message as the request to enable the coefficient tuning procedure. In some embodiments, the indication may be transmitted according to a periodicity (e.g., every two hours).

In response to the indication, network management entity 405 may select and configure the corresponding sets of coefficients for its managed nodes. For example, in operation 425*a*, network management entity 405 may transmit configuration information associated with managed node 403 to managed node 403. In some examples, the configuration information may indicate an identity of managed node 403, the selected set of coefficients for managed node 403, and a time to implement the selected set of coefficients.

For instance, the configuration information may be represented as RIS-coeff-information={id, coefficient-set-id, time}, where id is the identity of the target managed node (e.g., managed node 403), coefficient-set-id is the selected coefficient set, and time indicates the time stamp when to implement the selected coefficient.

In operation 425*a*' (denoted by dotted arrow as an option), when managed node 403 can actively sense the environment, which can be regarded as a kind of advanced managed node, managed node 403 may transmit the sensing results to network management entity 405 in response to applying the set of coefficients in the configuration information. Network management entity 405 may forward the sensing results to BS 402 to assist the determination of whether the selected coefficient set can optimize network performance. When managed node 403 does not have such capability, operation 425*a*' can be omitted.

During the coefficient tuning procedure, the above operations may be repeatedly performed. For example, operations 423*b* and 425*b* may be similar to operations 423*a* and 425*a* except that another set of coefficients may be selected and configured to managed node 403 in operations 423*b* and 425*b*. Operation 425*b*' is optional and is similar to operation 425*a*'.

At some point, BS 402 may determine a completion of the coefficient tuning procedure. For example, when all combinations of candidate coefficients of all managed nodes are checked, BS 402 may determine the completion of the coefficient tuning procedure. For example, when the number of coefficient configuration operations reaches a threshold (e.g., operations 423*a* and 425*a* being repeated a certain number of times), BS 402 may determine the completion of the coefficient tuning procedure.

In response to the completion of the coefficient tuning procedure, BS 402 may, in operation 427, inform network management entity 405 of the completion of the coefficient tuning procedure. In operation 429 (denoted by dotted arrow as an option), network management entity 405 may transmit the sensing results, if any, to BS 402.

During the coefficient tuning procedure, BS 402 may collect enough network performance information with the corresponding configuration information (e.g., coefficients for managed nodes). In response to the completion of the coefficient tuning procedure, BS 402 may, in operation 431, determine at least one optimal configuration associated with at least one network performance optimization target (e.g., cell-throughput, coverage, and energy consumption) for the managed nodes (e.g., managed node 403) of network management entity 405 based on the configuration information and the corresponding network performance information.

For example, for each managed node, BS 402 may determine the best coefficients for a network performance optimization target at a certain time of day, for example, as shown in above Table 1. Similar tables can be derived for various optimization targets, such as coverage, energy consumption, or any combination thereof. After the optimal coefficients are derived, the coefficients of each managed node can be configured for the managed node according to the coefficient table at different times of day.

For example, the setting procedure 440 may be performed such that the managed nodes can be configured based on the desired network performance optimization target and the derived optimal coefficients.

For example, BS 402 may determine an optimization target (e.g., cell-throughput, coverage, energy consumption, or any combination thereof). In operation 441, BS 402 may transmit to network management entity 405 an optimal configuration from the at least one optimal configuration based on the optimization target. For example, at different times of day, BS 402 may select a corresponding optimal coefficient for managed node 403 from, for example, a corresponding coefficient table based on the optimization target.

In operation 443, network management entity 405 may transmit the optimal configuration to managed node 403. In operation 445 (denoted by dotted arrow as an option), when managed node 403 can actively sense the environment, managed node 403 may transmit the sensing results to network management entity 405 in response to applying the optimal configuration. When managed node 403 does not have such capability, operation 445 can be omitted.

In operation 447, network management entity 405 may transmit an acknowledgement of the optimal configuration to BS 402. In operation 449 (denoted by dotted arrow as an option), network management entity 405 may transmit the sensing results from managed node 403 to BS 402.

In some embodiments, when any long-term network-related information changes, such as network deployment, it may be necessary to re-perform the coefficient tuning procedure, and thus new coefficient tables for various optimization targets may be obtained. The setting procedure may also be re-started when needed.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
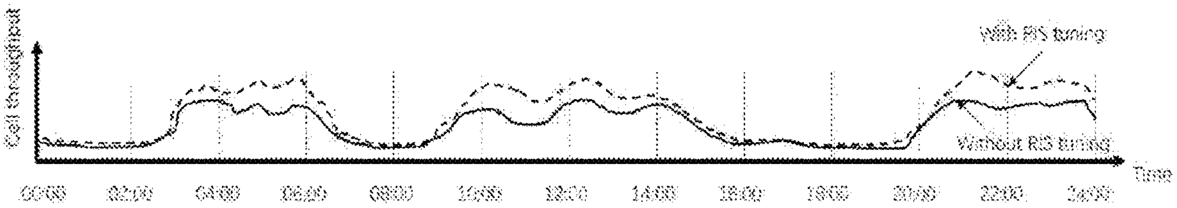
FIG. 5 illustrates an exemplary network performance result in accordance with some embodiments of the present disclosure.

FIG. 5 illustrates that long-term network performance (e.g., cell-throughout) can be improved with the optimized coefficients.

Figure 6:
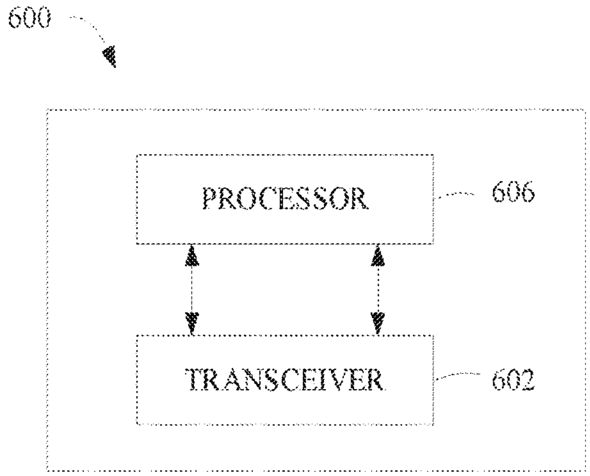
FIG. 6 illustrates a block diagram of an exemplary apparatus in accordance with some embodiments of the present disclosure.

FIG. 6 illustrates a block diagram of an exemplary apparatus 600 according to some embodiments of the present disclosure. As shown in FIG. 6, the apparatus 600 may include at least one processor 606 and at least one transceiver 602 coupled to the processor 606. The apparatus 600 may be a network management entity (e.g., an RIS management center) or a BS.

Although in this figure, elements such as the at least one transceiver 602 and processor 606 are described in the singular, the plural is contemplated unless a limitation to the singular is explicitly stated. In some embodiments of the present application, the transceiver 602 may be divided into two devices, such as a receiving circuitry and a transmitting circuitry. In some embodiments of the present application, the apparatus 600 may further include an input device, a memory, and/or other components.

In some embodiments of the present application, the apparatus 600 may be a network management entity. The transceiver 602 and the processor 606 may interact with each other so as to perform the operations with respect to the network management entity described in FIGS. 1-4. In some embodiments of the present application, the apparatus 600 may be a BS. The transceiver 602 and the processor 606 may interact with each other so as to perform the operations with respect to the BS described in FIGS. 1-4.

In some embodiments of the present application, the apparatus 600 may further include at least one non-transitory computer-readable medium.

For example, in some embodiments of the present disclosure, the non-transitory computer-readable medium may have stored thereon computer-executable instructions to cause the processor 606 to implement a method(s) with respect to the network management entity(s) as described above. For example, the computer-executable instructions, when executed, cause the processor 606 interacting with transceiver 602 to perform the operations with respect to the network management entity described in FIGS. 1-4.

In some embodiments of the present disclosure, the non-transitory computer-readable medium may have stored thereon computer-executable instructions to cause the processor 606 to implement a method(s) with respect to the BS as described above. For example, the computer-executable instructions, when executed, cause the processor 606 interacting with transceiver 602 to perform the operations with respect to the BS described in FIGS. 1-4.

Those having ordinary skill in the art would understand that the operations or steps of a method(s) described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms “includes,” “including,” or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A network management entity, comprising:
at least one memory; and
at least one processor coupled with the at least one memory and configured to cause the network management entity to:
transmit, to a managed node, a request for attribution information of the managed node, wherein the network management entity manages the managed node;
receive, from the managed node, the requested attribution information of the managed node;
transmit, to a base station (BS) of a radio access network (RAN), a registration request to register in the RAN, wherein the managed node is configured to adjust a radio propagation environment of the RAN; and
receive, from the BS, an acknowledgement message in response to the registration request.

2. The network management entity of claim 1, wherein the attribution information of the managed node comprises at least one of:
an identity of the managed node;
a type indication of the managed node;
a set of candidate coefficients of the managed node;
a position of the managed node; or
an orientation of the managed node.

3. The network management entity of claim 1, wherein the acknowledgement message indicates that the network management entity is authorized to access network performance information.

4. The network management entity of claim 1, wherein the at least one processor is further configured to cause the network management entity to:
receive a request from the BS to enable a coefficient tuning procedure; and
perform the coefficient tuning procedure in response to the request to enable the coefficient tuning procedure.

5. The network management entity of claim 4, wherein to perform the coefficient tuning procedure, the at least one processor is configured to cause the network management entity to:
select a set of coefficients for the managed node;
transmit, to the managed node, configuration information associated with the managed node, wherein the configuration information indicates an identity of the managed node, the selected set of coefficients, and a time to implement the selected set of coefficients;
transmit, to the BS, a request for network performance information in response to transmission of the configuration information; and
receive the requested network performance information.

6. The network management entity of claim 5, wherein the network performance information indicates collected information that includes at least one of a distribution of user equipment (UE) served by the BS, cell throughput of the BS, or energy consumption of the BS, and a time when the collected information is collected.

7. The network management entity of claim 1, wherein the registration request comprises the attribution information of the managed node.

8. A base station (BS), comprising:
at least one memory; and
at least one processor coupled with the at least one memory and configured to cause the BS to:
receive, from a network management entity, a registration request to register in a radio access network (RAN) associated with the BS, wherein the network management entity manages a managed node which is configured to adjust a radio propagation environment of the RAN; and
transmit, to the network management entity, an acknowledgement message in response to the registration request.

9. The BS of claim 8, wherein the acknowledgement message indicates that the network management entity is authorized to access network performance information.

10. The BS of claim 9, wherein the network performance information indicates collected information that includes at least one of a distribution of user equipment (UE) served by the BS, cell throughput of the BS, or energy consumption of the BS, and a time when the collected information is collected.

11. The BS of claim 8, wherein the at least one processor is further configured to cause the BS to:
transmit, to the network management entity, a request to enable a coefficient tuning procedure, wherein the request to enable the coefficient tuning procedure indicates at least one off a time interval or a location of the managed node for updating coefficients of the managed node.

12. The BS of claim 11, wherein the at least one processor is further configured to cause the BS to:
transmit, to the network management entity, a network performance optimization target.

13. The BS of claim 8, wherein the registration request comprises attribution information of the managed node.

14. The BS of claim 13, wherein the attribution information of the managed node comprises at least one of:
an identity of the managed node;
a type indication of the managed node;
a set of candidate coefficients of the managed node;
a position of the managed node; or
an orientation of the managed node.

15. A method performed by a network management entity, comprising:
transmitting, to a managed node, a request for attribution information of the managed node, wherein the network management entity manages the managed node;
receiving, from the managed node, the requested attribution information of the managed node;
transmitting, to a base station (BS) of a radio access network (RAN), a registration request to register in the RAN, wherein the managed node is configured to adjust a radio propagation environment of the RAN; and
receiving, from the BS, an acknowledgement message in response to the registration request.

16. The method of claim 15, wherein the attribution information of the managed node comprises at least one of:
an identity of the managed node;
a type indication of the managed node;
a set of candidate coefficients of the managed node;
a position of the managed node; or
an orientation of the managed node.

17. The method of claim 15, wherein the acknowledgement message indicates that the network management entity is authorized to access network performance information.

18. The method of claim 15, further comprising:
receiving, from the BS, a request to enable a coefficient tuning procedure; and
performing the coefficient tuning procedure in response to the request to enable the coefficient tuning procedure.

19. The method of claim 18, wherein to perform the coefficient tuning procedure, the method further comprising:
selecting a set of coefficients for the managed node;
transmitting, to the managed node, configuration information associated with the managed node, wherein the configuration information indicates an identity of the managed node, the selected set of coefficients, and a time to implement the selected set of coefficients;
transmitting, to the BS, a request for network performance information in response to transmission of the configuration information; and
receiving the requested network performance information.

20. A processor for wireless communication, comprising:
at least one controller coupled with at least one memory and configured to cause the processor to:
transmit, to a managed node, a request for attribution information of the managed node;
receive, from the managed node, the requested attribution information of the managed node;
transmit, to a base station (BS) of a radio access network (RAN), a registration request to register in the RAN, wherein the managed node is configured to adjust a radio propagation environment of the RAN; and
receive, from the BS, an acknowledgement message in response to the registration request.

* * * * *